United States Patent
Maxey et al.

(10) Patent No.: US 10,160,898 B2
(45) Date of Patent: Dec. 25, 2018

(54) DIVERTER COMPOSITION INCLUDING RHEOLOGICALLY-MODIFIED INVERT EMULSION AND METHOD OF USE

(71) Applicant: Halliburton Energy Services, Inc., Houston, TX (US)

(72) Inventors: Jason Eric Maxey, Spring, TX (US); Humberto Almeida Oliveira, The Woodlands, TX (US); Lu Zheng, Kingwood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/324,347

(22) PCT Filed: Aug. 6, 2014

(86) PCT No.: PCT/US2014/049968
§ 371 (c)(1),
(2) Date: Jan. 6, 2017

(87) PCT Pub. No.: WO2016/022113
PCT Pub. Date: Feb. 11, 2016

(65) Prior Publication Data
US 2017/0198190 A1  Jul. 13, 2017

(51) Int. Cl.
*E21B 33/138* (2006.01)
*C09K 8/50* (2006.01)
(Continued)

(52) U.S. Cl.
CPC ............... *C09K 8/36* (2013.01); *C09K 8/467* (2013.01); *C09K 8/487* (2013.01); *C09K 8/62* (2013.01); *C09K 8/76* (2013.01); *C09K 8/84* (2013.01); *E21B 21/00* (2013.01); *E21B 33/138* (2013.01); *E21B 43/16* (2013.01); *E21B 43/25* (2013.01);
(Continued)

(58) Field of Classification Search
CPC ......... E21B 33/138; C09K 8/50; C09K 8/502; C09K 8/36
See application file for complete search history.

(56) References Cited

U.S. PATENT DOCUMENTS

| 3,901,316 A | * | 8/1975 | Knapp | C09K 8/502 166/294 |
| 4,233,165 A | | 11/1980 | Salathiel et al. | |

(Continued)

FOREIGN PATENT DOCUMENTS

WO  2014001192 A1  1/2014

OTHER PUBLICATIONS

International Search Report and Written Opinion issued in corresponding PCT application No. PCT/US2014/049968, dated May 6, 2015, 17 pgs.

(Continued)

*Primary Examiner* — Catherine Loikith
(74) *Attorney, Agent, or Firm* — Chamberlain Hrdlicka

(57) ABSTRACT

Diverter compositions including an invert emulsion. A method of treating a subterranean formation. The method can include placing in a subterranean formation a diverter composition including an invert emulsion. The invert emulsion includes a continuous oil phase that includes at least one rheological modifier. The invert emulsion also includes an internal aqueous phase.

19 Claims, 5 Drawing Sheets

(51) Int. Cl.
  *C09K 8/502*   (2006.01)
  *C09K 8/36*    (2006.01)
  *C09K 8/84*    (2006.01)
  *C09K 8/467*   (2006.01)
  *C09K 8/487*   (2006.01)
  *C09K 8/76*    (2006.01)
  *C09K 8/62*    (2006.01)
  *E21B 21/00*   (2006.01)
  *E21B 43/25*   (2006.01)
  *E21B 43/26*   (2006.01)
  *E21B 43/16*   (2006.01)

(52) U.S. Cl.
  CPC .......... *E21B 43/26* (2013.01); *C09K 2208/08* (2013.01); *C09K 2208/24* (2013.01); *C09K 2208/26* (2013.01); *C09K 2208/32* (2013.01)

(56) References Cited

U.S. PATENT DOCUMENTS

| | | | |
|---|---|---|---|
| 7,806,182 | B2 | 10/2010 | Waters et al. |
| 2005/0000694 | A1 | 1/2005 | Dalrymple |
| 2008/0302570 | A1 | 12/2008 | DeBoer |
| 2014/0054039 | A1* | 2/2014 | Chang .................. E21B 21/003 166/293 |
| 2014/0116701 | A1 | 5/2014 | Tang |
| 2014/0367100 | A1 | 12/2014 | Oliveira et al. |

OTHER PUBLICATIONS

Allan Ye, Chris Pierce, Marlon McKoy and Jason Maxey; Field Trial Evaluation on a Hydrocarbon-Free Friction Reducer; AADE-14-FTCE-34—Presentation at the 2014 AADE (American Association of Drilling Engineers) Fluids Technical Conference and Exhibition in Houston, TX, Apr. 15-16, 2014. 5 Pages.

Ali A. Al-Taq, Hisham A. Nasr-El-Din, Ridha A. Lajami, Effective Acid Diversion and Water Control in Carbonate Reservoirs Using an Associative Polymer Treatment: Case Histories from Saudi Arabia; SPE 109714—Presentation at the 2007 SPE Annual Technical Conference Exhibition held in Anaheim, CA, Nov. 11-14, 2017. 16 pages.

Jason Maxey and Y.T. Hu, Halliburton; Proppant Suspension in Acid Emulsions for Well Stimulation; AADE-14-FTCE-37—Presentation at the 2014 AADE (American Association of Drilling Engineers) Fluids Technical Conference and Exhibition in Houston, TX, Apr. 15-16, 2014. 6 Pages.

Vijaya K. Patnana, Prasad B. Karadkar, and Yogesh Kumar Choudhary; An Environmentally Acceptable and Non-Damaging Diversion System for High-Permeability Formations; SPE 165191—Presentation at the SPE European Formation Damage Conference and Exhibition in Noordwijk, The Netherlands, Jun. 5-7, 2013. 9 Pages.

Julio Vasquez, Bart Waltman, and Larry Eoff; Field Implementation of a Novel Soilds-Free System to Minimize Fluid Loss during Overbalanced Workover Operations; SPE 130210—Presentation at the SPE EUROPEC/EAGE Annual Conference and Exhibition held in Barcelona, Spain, Jun. 14-17, 2010. 6 Pages.

R.W. Clanton, J.A.Haney, R. Pruett, C.L.. Wahl, J.J. Goiffon, and D. Gualtieri, Real-Time Monitoring of Acid Stimulation Using a Fiber-Optic DTS System; SPE 100617—Presentation at the 2006 SPE Western Regional/AAPG Pacific Section/GSA Cordilleran Section Joint Meeting held in Anchorage, Alaska on May 8-10, 2006. 10 Pages.

* cited by examiner

DIVERTER COMPOSITION INCLUDING RHEOLOGICALLY-MODIFIED INVERT EMULSION AND METHOD OF USE

BACKGROUND

Injected fluids tend to follow the path of least resistance, sometimes resulting in the least permeable areas receiving inadequate treatment. For example, during an acidizing treatment, acids form wormholes or flow pathways that continue to receive a majority of subsequently injected acidizing fluids. Lower-resistance pathways can cause problematic fluid loss or an undesirable fluid distribution during a variety of subterranean treatments, such as drilling, stimulation (e.g., hydraulic fracturing, matrix stimulation), sand control (e.g., gravel packing, frac-packing, and sand consolidation), and water control.

A diverter is a chemical agent or mechanical device used in an injection treatment to help ensure a more uniform distribution of treatment fluid across a treatment interval. A diverter can be used to bridge off one or more perforations, fractures, or flow pathways to control which zone is fractured. By using a diverter, a treatment can be focused on the areas requiring the most treatment. However, many available chemical diverters leave behind permeability-decreasing residue in the subterranean formation that cannot be easily or quickly removed, cannot be easily combined with acids, cannot be easily mixed on-the-fly, and do not have easily controllable viscosity and solids-suspension capacity.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
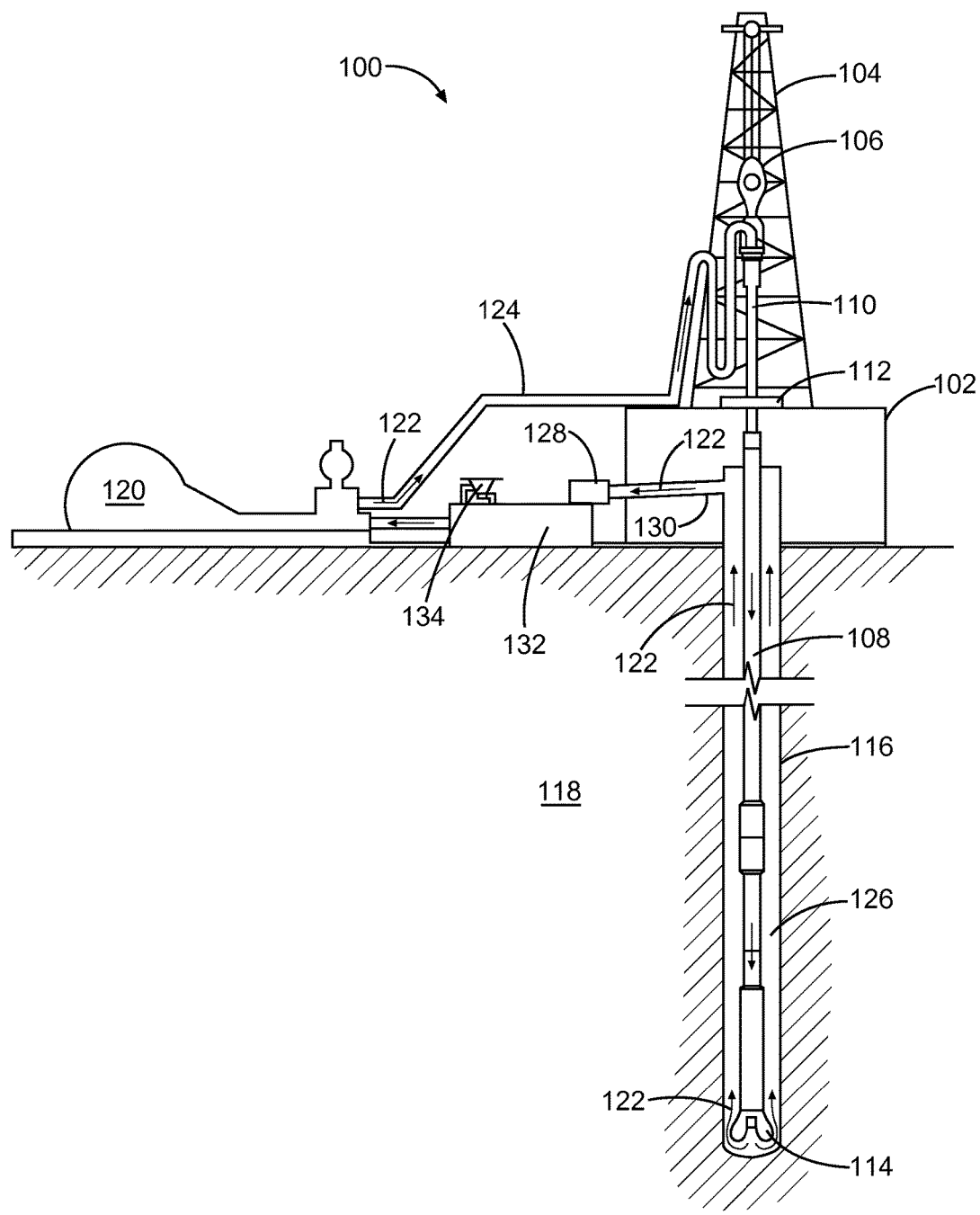
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C (O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R) N(R)C(O)R, N(R)N(R)C(O)OR, N(R)N(R)CON(R)$_2$, N(R) SO$_2$R, N(R)SO$_2$N(R)$_2$, N(R)C(O)OR, N(R)C(O)R, N(R)C (S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O) R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O) OR, N(R)C(O)R, N(R)C(S)R, N(R)C(O)N(R)$_2$, N(R)C(S)N (R)$_2$, N(COR)COR, N(OR)R, C(=NH)N(R)$_2$, C(O)N(OR) R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH (CH$_3$), —CH=C(CH$_3$)$_2$, —C(CH$_3$)=CH$_2$, —C(CH$_3$) =CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C$_2$-heterocyclyl can be a 5-ring with two carbon atoms and three heteroatoms, a 6-ring with two carbon atoms and four heteroatoms and so forth. Likewise a C$_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula $N(group)_3$ wherein each group can independently be H or non-H, such as alkyl, aryl, and the like. Amines include but are not limited to $R-NH_2$, for example, alkylamines, arylamines, alkylarylamines; $R_2NH$ wherein each R is independently selected, such as dialkylamines, diarylamines, aralkylamines, heterocyclylamines and the like; and $R_3N$ wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form $-NH_2$, $-NHR$, $-NR_2$, $-NR_3^+$, wherein each R is independently selected, and protonated forms of each, except for $-NR_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

The term "standard temperature and pressure" as used herein refers to 20° C. and 101 kPa.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$)hydrocarbyl (e.g., ($C_1$-$C_{10}$)alkyl or ($C_6$-$C_{20}$)aryl) at least one of interrupted with 0, 1, 2, or 3 groups independently substituted from —O—, substituted or unsubstituted —NH—, and —S—, a poly (substituted or unsubstituted ($C_1$-$C_{20}$)hydrocarbyloxy), and a poly(substituted or unsubstituted ($C_1$-$C_{20}$)hydrocarbylamino).

In various embodiments, the present invention provides a method of treating a subterranean formation. The method includes placing in a subterranean formation a diverter composition. The diverter composition includes an invert emulsion. The invert emulsion includes a continuous oil phase including at least one rheological modifier. The invert emulsion also includes an internal aqueous phase.

In various embodiments, the present invention provides a method of treating a subterranean formation. The method includes placing in a subterranean formation a diverter composition including an invert emulsion. The invert emulsion includes about 10 vol % to about 50 vol % of a continuous oil phase. The oil phase includes at least one rheological modifier. The rheological modifier includes at least one of a mono- or poly-(substituted or unsubstituted ($C_2$-$C_{10}$)alkylene) diol having 0, 1, or 2 hydroxy groups etherified with a ($C_1$-$C_{50}$)hydrocarbyl group, a clay, a silica, and a di- or tri-($C_{10}$-$C_{50}$)hydrocarbylamine, wherein each ($C_{10}$-$C_{50}$)hydrocarbyl and ($C_1$-$C_{50}$)hydrocarbyl is independently selected and is independently substituted or unsubstituted, and wherein each ($C_{10}$-$C_{50}$)hydrocarbyl is independently interrupted by 0, 1, 2, or 3 groups selected from —O—, —S—, and substituted or unsubstituted —NH—. The rheological modifier is about 0.001 vol % to about 10 vol % of the invert emulsion. The invert emulsion also includes about 50 vol % to about 90 vol % of an internal aqueous phase. The internal aqueous phase includes an internal active agent. The internal active agent includes at least one of a bridging agent and a polymer including a repeating unit that is a carboxylic acid- or amide-substituted further-substituted or unsubstituted ethylene unit. Each ethylene unit is independently further unsubstituted or further substituted. Each carboxylic acid and amide substituent is independently directly substituted on the ethylene unit or substituted via a linker that is a ($C_1$-$C_{10}$) substituted or unsubstituted hydrocarbyl interrupted by 0, 1, 2, or 3 groups chosen from —O—, —S—, and substituted or unsubstituted —NH—. Each amide substituent is independently unmodified or is hydrophobically modified. Each carboxylic acid substituent is independently unmodified, is a salt thereof, or is hydrophobically modified. The hydrophobic modification is independently a ($C_4$-$C_{50}$) substituted or unsubstituted hydrocarbyl group interrupted by 0, 1, 2, or 3 groups chosen from —O—, —S—, and substituted or unsubstituted —NH—. About 0.001 vol % to about 15 vol % of the invert emulsion is one or more emulsifiers.

In various embodiments, the present invention provides a system including a diverter composition including an invert emulsion. The invert emulsion includes a continuous oil phase including at least one rheological modifier. The invert emulsion also includes an internal aqueous phase. The system also includes a subterranean formation including the diverter composition therein.

In various embodiments, the present invention provides a diverter composition for treatment of a subterranean formation. The diverter composition includes an invert emulsion that includes a continuous oil phase including at least one rheological modifier. The diverter composition also includes an internal aqueous phase.

In various embodiments, the present invention provides a diverter composition for treatment of a subterranean formation. The diverter composition includes an invert emulsion. The invert emulsion includes about 10 vol % to about 50 vol % of a continuous oil phase. The continuous oil phase includes at least one rheological modifier. The rheological modifier includes at least one of a mono- or poly-(substituted or unsubstituted ($C_2$-$C_{10}$)alkylene) diol having 0, 1, or 2 hydroxy groups etherified with a ($C_1$-$C_{50}$)hydrocarbyl group, a clay, a silica, and a di- or tri-($C_{10}$-$C_{50}$)hydrocarbylamine. Each ($C_{10}$-$C_{50}$)hydrocarbyl and ($C_1$-$C_{50}$)hydrocarbyl is independently selected and is independently substituted or unsubstituted. Each ($C_{10}$-$C_{50}$)hydrocarbyl is independently interrupted by 0, 1, 2, or 3 groups selected from —O—, —S—, and substituted or unsubstituted —NH—. The rheological modifier is about 0.001 vol % to about 10 vol % of the invert emulsion. The invert emulsion also includes about 50 vol % to about 90 vol % of an internal aqueous phase. The internal aqueous phase includes an internal active agent. The internal active agent includes at least one of a bridging agent and a polymer including a repeating unit that is a carboxylic acid- or amide-substituted further-substituted or unsubstituted ethylene unit. Each ethylene unit is independently further unsubstituted or further substituted. Each carboxylic acid and amide substituent is independently directly substituted on the ethylene unit or substituted via a linker that is a ($C_1$-$C_{10}$) substituted or unsubstituted hydrocarbyl interrupted by 0, 1, 2, or 3 groups chosen from —O—, —S—, and substituted or unsubstituted —NH—. Each amide substituent is independently unmodified or is hydrophobically modified. Each carboxylic acid substituent is independently unmodified, is a salt thereof, or is hydrophobically modified. The hydrophobic modification is independently a ($C_4$-$C_{50}$) substituted or unsubstituted hydrocarbyl group interrupted by 0, 1, 2, or 3 groups chosen from —O—, —S—, and substituted or unsubstituted —NH—. About 0.001 vol % to about 15 vol % of the invert emulsion is one or more emulsifiers.

Various embodiments of the present invention provide a method of preparing a diverter composition for treatment of a subterranean formation. The method includes forming a diverter composition. The diverter composition includes an invert emulsion including a continuous oil phase including at least one rheological modifier. The invert emulsion also includes an internal aqueous phase.

In various embodiments, the invert emulsion can be combined with or can include bridging solids, such as bridging particulate solids, such as bridging degradable (e.g., biodegradable) solids, such as for diversion (e.g., extreme diversion) in subterranean formations that are highly naturally fractured.

In various embodiments, the diverter composition has certain advantages over other diverter compositions and methods of using the same, at least some of which are unexpected. For example, in various embodiments, the diverting composition can be a combined acidizing fluid and diverting fluid (e.g., the internal phase of the diverting composition), while in other embodiments the diverting composition can be non-acidic. In various embodiments, the rheology and solids-suspension capacity of the diverting composition can be easily controlled. In some embodiments, the rheology of the diverting composition can be adjusted on-the-fly, allowing the diverter composition to be readily adapted to conditions downhole for improved diversion. In various embodiments, the diverting composition mainly or only leaves behind chemical residues that are oil-soluble, such that they may be easily dissolved and removed such as during flow back.

In various embodiments, by providing more easily customizable viscosity and solids-carrying capacity, the diverting composition can provide more effective diversion away from low resistance areas and provide a more uniform distribution of treatment fluid across a treatment interval. In various embodiments, by providing a combined acidizing and diverting composition, a stimulation treatment can be carried out more efficiently and with more even treatment than with other methods. In various embodiments, by using the diverting composition as an acidizing composition, or by sequentially performing an acidizing procedure after applying a non-acidic embodiment of diverting composition, the better diversion provided results in a more effective stimulation treatment with higher resulting production rates. In various embodiments, the ability to control the properties of the diverting composition on-the-fly makes it easier to adapt the diverting composition to a wider variety of subterranean conditions, providing a more effective treatment than other methods. In various embodiments, the oil-soluble residues left behind by the diverting composition can be easily dissolved and removed to provide higher permeability after treatment than other methods, increasing production.

Method of Treatment of a Subterranean Formation.

In some embodiments, the present invention provides a method of treating a subterranean formation. The method includes placing the diverter composition in a subterranean formation. The diverter composition includes an invert emulsion. The invert emulsion includes a continuous oil phase including at least one rheological modifier. The invert emulsion includes an internal aqueous phase. The placing of the diverter composition in the subterranean formation can include contacting the diverter composition and any suitable part of the subterranean formation, or contacting the diverter composition and a subterranean material, such as any suitable subterranean material. The subterranean formation can be any suitable subterranean formation. In some examples, the placing of the diverter composition in the subterranean formation includes contacting the diverter composition with, placing, or depositing the diverter composition in at least one of a fracture, at least a part of an area surrounding a fracture, a flow pathway, an area surrounding a flow pathway, and an area desired to be fractured. The placing of the diverter composition in the subterranean formation can be any suitable placing and can include any suitable contacting between the subterranean formation and the diverter composition. The method can include obtaining or providing the diverter composition including the invert emulsion. The obtaining or providing of the diverter composition can occur at any suitable time and at any suitable location. The obtaining or providing of the diverter composition can occur above the surface. The obtaining or providing of the diverter composition can occur in the subterranean formation (e.g., downhole).

The method can include using the diverter composition in any suitable way, such as alone or in conjunction with other treatments. In some embodiments, the method can be a method of drilling, stimulation, fracturing, spotting, cleanup, completion, remedial treatment, applying a pill, acidizing, cementing, packing, spotting, or a combination thereof. The method can including performing a treatment such as perforating, acidizing, injecting of cleaning fluids, propellant stimulation, and hydraulic fracturing.

The method can include acidizing. In some embodiments, the diverter composition is an acidizing composition. In some embodiments, the diverter composition is used in conjunction with another composition that is an acidizing composition.

The method can include hydraulic fracturing, such as a method of hydraulic fracturing to generate a fracture or flow pathway. The placing of the diverter composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant).

The method can include performing a stimulation treatment at least one of before, during, and after placing the diverter composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the diverter composition is placed or contacted, or the diverter composition is placed or contacted to an area surrounding the generated fracture or flow pathway.

Invert Emulsion.

The diverter composition includes an invert emulsion. The invert emulsion includes a continuous oil phase and an internal (e.g. discontinuous) aqueous phase. In various embodiments, once the emulsion-based diverter composition reaches a desired treatment interval, the emulsion can flip (e.g., break) upon contact with the formation rock, allowing the subterranean formation and the aqueous phase to come into contact, providing a diverting effect. In some embodiments, the aqueous phase can include an internal active agent that provides a diverting effect upon contact With the subterranean formation.

The invert emulsion can form any suitable proportion of the diverter composition. The invert emulsion can be 100 wt % of the diverter composition. The invert emulsion can be about 1 wt % to about 100 wt % of the diverter composition, or about 20 wt % to about 99 wt %, or about 50 wt % to about 99 wt %, or about 1 wt % or less, or about 2 wt %, 3, 4, 5, 6, 8, 10, 12, 14, 16, 18, 20, 25, 30, 35, 40, 45, 50, 55, 60, 65, 70, 75, 80, 85, 90, 91, 92, 93, 94, 95, 96, 97, 98, or about 99 wt % or more of the diverter composition.

The flipping or breaking of the emulsion in the subterranean formation can be triggered in any suitable way, such as by one or more of temperature, pressure, time, and chemicals (e.g., by the use of one or more de-emulsifiers), The contacting of the aqueous phase and the subterranean formation can reduce permeability of the contacted subterranean formation to aqueous liquids (e.g., liquids that are predominantly water) by any suitable amount, such as about 1% to about 100%, about 70% to about 95%, about 1% or less, or about 2%, 3, 4, 5, 6, 8, 10, 12, 14, 16, 18, 20, 25, 30, 35, 40, 45, 50, 55, 60, 65, 70, 75, 80, 85, 90, 91, 92, 93, 94, 95, 96, 97, 98, or by about 99% or more. The contacting of the aqueous phase and the subterranean formation can reduce permeability of the contacted subterranean formation to oil (e.g., liquids including predominantly one or more oils or organic solvents) by about 1% to about 100%, about 30% to about 70%, about 1% or less, or about 2%, 3, 4, 5, 6, 8, 10, 12, 14, 16, 18, 20, 25, 30, 35, 40, 45, 50, 55, 60, 65, 70, 75, 80, 85, 90, 91, 92, 93, 94, 95, 96, 97, 98, or by about 99% or more. The contacting of the aqueous phase and the subterranean formation can reduce permeability of the contacted subterranean formation to oil by less than the contacting of the aqueous phase and the subterranean formation reduces permeability of the contacted subterranean formation to aqueous liquids.

The aqueous phase can be any suitable vol % (volume percent) of the invert emulsion. For example, the aqueous phase can be about 1 vol % to about 99 vol %, about 50 vol % to about 90 vol %, or about 1 vol % or less, or about 2 vol %, 3, 4, 5, 6, 8, 1.0, 12, 14, 16, 18, 20, 25, 30, 35, 40, 45, 50, 55, 60, 65, 70, 75, 80, 85, 90, 91, 92, 93, 94, 95, 96, 97, 98, or about 99 vol % or more of the invert emulsion. The aqueous phase can be any one or more suitable aqueous liquids (e.g., liquids that are predominantly water). The aqueous phase can be fresh water. The aqueous phase can include a salt water, containing one or more salts at any suitable concentration. The aqueous phase can include at least one of brine, produced water, flowback water, brackish water, and sea water. The aqueous phase can include any suitable salt, such as at least one of NaBr, $CaCl_2$, $CaBr_2$, $ZnBr_2$, KCl, NaCl, a magnesium salt, a bromide salt, a formate salt, an acetate salt, and a nitrate salt. The aqueous phase can have any suitable total dissolved solids level (e.g., wherein the dissolved solids correspond to dissolved salts), such as about 1,000 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. The aqueous phase can have any suitable salt concentration, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200,000, 225,000, 250,000, 275,000, or about 300,000 ppm or more. In some examples, the aqueous phase can have a concentration of at least one of NaBr, $CaCl_2$, $CaBr_2$, $ZnBr_2$, KCl, and NaCl of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% w/v or more. The aqueous phase can have any suitable pH, such as about 7 (e.g., neutral) or more, or about −2 to about 6.5 (e.g., acidic), or about −2 or less, or about −1.5, −1, −0.5, 0, 0.5, 1, 1.5, 2, 2.5, 3, 3.5, 4, 4.5, 5, 5.5, 6, or about 6.5 or more. In embodiments wherein the aqueous phase is acidic, the aqueous phase can include any suitable acid, such as at least one of HCl, $H_2SO_4$, HF, acetic acid, and formic acid.

The oil phase can be any suitable vol % of the invert emulsion. For example, the oil phase can be about 1 vol % to about 99 vol % of the invert emulsion, about 10 vol % to about 50 vol %, or about 1 vol % or less, or about 2 vol %, 3, 4, 5, 6, 8, 10, 12, 14, 16, 18, 20, 25, 30, 35, 40, 45, 50, 55, 60, 65, 70, 75, 80, 85, 90, 91, 92, 93, 94, 95, 96, 97, 98, or about 99 vol % or more of the invert emulsion. The oil phase can include one or more suitable oils or organic solvents. In various embodiments, the oil phase includes at least one of gasoline, diesel, kerosene, naptha, an organic solvent, and a paraffin.

Rheological Modifier.

In various embodiments, the diverter composition includes one or more rheological modifiers. For example, the oil phase of the invert emulsion can include one or more rheological modifiers, wherein the rheological modifiers can be oil soluble such that the majority of the rheological modifiers are in the oil phase but small amounts can also occur in the aqueous phase. The rheological modifier can adjust and control the rheological properties of the composition, such as at least one of viscosity, elastic modulus, viscous modulus, and complex viscosity. By controlling the rheological properties of the diverter composition, the diversion provided by the composition can be controlled. In some embodiments, the one or more rheological modifier can be used to control the emulsion's rheological properties on-the-fly (e.g., during or immediately before placing in the subterranean formation) to achieve adjustable (e.g., tuned) levels of diversion and better fluid placement in the subterranean formation. The amount of rheological modifier added can be varied to control the extent of the diverter composition's self-diversion and the solids-suspending and solids-transporting (e.g., bridging agent, proppant, cuttings, and the like) capacity of the diverter composition.

In various embodiments, the method can include adding the one or more rheological modifiers to the invert emulsion to prepare the diverter composition on-the-fly. In some embodiments, the method can include monitoring conditions downhole in any suitable way, and adjusting the concentration or type of the one or more rheological modifiers in the diverter composition accordingly. For example, downhole temperature sensing (DTS) can be used to monitor downhole conditions, such as by using fiber optics to see where the diverter composition is going in the perforation interval in real time.

The rheological modifier can include at least one of a viscosifier (e.g., modify (increase) viscosity) and an elastifier (e.g., modify at least one of elastic modulus, viscous modulus, and complex viscosity). In some embodiments, a rheological modifier can be one or both of a viscosifier and an elastifier. The rheological modifier can be any suitable vol % of the invert emulsion. In some embodiments, the one or more rheological modifiers can be about 0.001 vol % to about 10 vol % of the invert emulsion, about 0.1 vol % to about 2 vol %, or about 0.001 vol % or less, or about 0.005 vol %, 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2, 2.5, 3, 3.5, 4, 4.5, 5, 6, 7, 8, 9, or 10 vol % or more.

In various embodiments, the rheological modifier is at least one of a mono- or poly-(substituted or unsubstituted ($C_2$-$C_{10}$)alkylene) diol having 0, 1, or 2 hydroxy groups etherified with a ($C_1$-$C_{50}$)hydrocarbyl group; a clay (e.g., a non-organophilic clay); a silica (e.g., a crystalline silica material); and a di- or tri-($C_{10}$-$C_{50}$)hydrocarbylamine; wherein each ($C_{10}$-$C_{50}$)hydrocarbyl and ($C_1$-$C_{50}$)hydrocarbyl is independently selected and is independently substituted or unsubstituted, and wherein each ($C_{10}$-$C_{50}$)hydrocarbyl is independently interrupted by 0, 1, 2, or 3 groups selected from —O—, —S—, and substituted or unsubstituted —NH—. The rheological modifier can be any suitable dimer or trimer fatty acids, such as the reaction product of mono- or di-carboxylic acids with an amine (e.g., ammonia or another amine), optionally including reduction and further modification. The rheological modifier can be at least one of a di- or tri-($C_{30}$-$C_{50}$)hydrocarbylamine, and a mono- or poly-($C_2$-$C_{10}$)alkylene diol mono($C_1$-$C_{10}$)alkyl ether. The rheological modifier can be (12E,15E)-N-[(21E,24E)-hexatriaconta-21,24-dien-1-yl]hexatriaconta-12,15-dien-1-amine. The rheological modifier can be dipropylene glycol monomethyl ether.

Clays can include clays of the montmorillonite (smectite) group such as montmorillonite, saponite, nontronite, hectorite, and sauconite; the kaolin group such as kaolinite, nacrite, dickite, and halloysite; the hydrousmica group such as hydrobiotite, glauconite, illite and bramallite; the chlorite group such as chlorite and chamo site; clay minerals not belonging to the above groups such as vermiculite, attapulgite, and sepiolite, and mixed-layer varieties of the such minerals and groups; other mineral components may further be associated with the clay.

Internal Active Agent.

In various embodiments, the diverter composition includes an internal active agent. For example, the internal aqueous phase of the invert emulsion can include one or more internal active agents, wherein the internal active agents can be aqueous soluble such that the majority of the internal active agents are in the aqueous phase but small amounts can also occur in the oil phase. The internal active agent can act as a diverting agent upon contacting with the subterranean formation. In various embodiments, the internal active agent, upon contacting the subterranean formation, decreases permeability of the contacted subterranean formation to water, oil, both water and oil, or decreases permeability to water while decreasing permeability to oil and gas to a lesser extent or not at all.

The one or more internal active agents can be present in the diverter composition in any suitable concentration. In some embodiments, the one or more internal active agents can be about 0.001 vol % to about 40 vol % of the invert emulsion, about 0.001 vol % to about 10 vol % of the invert emulsion, about 0.1 vol % to about 5 vol %, or about 0.001 vol % or less, or about 0.005 vol %, 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2, 2.5, 3, 3.5, 4, 4.5, 5, 6, 7, 8, 9, 10, 12, 14, 16, 18, 20, 22, 24, 26, 28, 30, 32, 34, 36, 38, or about 40 vol % or more.

In various embodiments, the internal active agent includes a polymer that is at least partially hydrophobically modified, wherein the hydrophobic modification is independently a $(C_4-C_{50})$ substituted or unsubstituted hydrocarbyl group interrupted by 0, 1, 2, or 3 groups chosen from —O—, —S—, and substituted or unsubstituted —NH—. At each modified location, the hydrophobic modification can be independently a $(C_{10}-C_{30})$ hydrocarbyl group. At each modified location, the hydrophobic modification can be independently a $(C_{10}-C_{30})$ alkyl group. The at least partial hydrophobic modification can include a hydrophobic group on any suitable proportion of the modifiable groups in the molecule, such as the carboxylic acid and amide groups. For example, the at least partial hydrophobic modification can include a hydrophobic group on about 0.001 mol % to about 100 mol % of modifiable groups (e.g., amides, carboxylic acids, or a combination thereof; or amines, hydroxy groups, amides, carboxylic acids, or a combination thereof), about 0.1 mol % to about 99.9 mol %, about 1 mol % to about 99 mol %, 5 mol % to about 95 mol %, 10 mol % to about 90 mol %, 25 mol % to about 75 mol %, or about 0.001 mol % or less, 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 mol % or more.

The internal active agent can include a polymer including a repeating unit that is a carboxylic acid- or amide-substituted ethylene unit, wherein each ethylene unit is independently further unsubstituted or further substituted, wherein each carboxylic acid and amide substituent is independently directly substituted on the ethylene unit or substituted via a linker that is a $(C_1-C_{10})$ substituted or unsubstituted hydrocarbyl interrupted by 0, 1, 2, or 3 groups chosen from —O—, —S—, and substituted or unsubstituted —NH—, wherein each amide substituent is independently unmodified or is hydrophobically modified (e.g., having a hydrophobic substituent on the nitrogen-atom of the amide), wherein each carboxylic acid substituent is independently unmodified, is a salt thereof, or is hydrophobically modified (e.g., an ester of the acid, wherein the ester group is hydrophobic). For carboxylic acid salts, the counterion can be any suitable counterion, such as $NH_4^+$, $Na^+$, $K^+$, $Li^+$, $Zn^{2+}$, $Al^{3+}$, $Ca^{2+}$ or $Mg^{2+}$.

The at least partially hydrophobically-modified polymer can include a repeating unit that is formed from vinyl alcohol, acrylic acid, acrylamide, methacrylic acid, methacrylamide, vinyl phosphonic acid, vinylidene diphosphonic acid, substituted or unsubstituted 2-acrylamido-2-methylpropanesulfonic acid, a substituted or unsubstituted $(C_1-C_{20})$ alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, maleic anhydride, a substituted or unsubstituted $(C_1-C_{20})$ alkenoic substituted or unsubstituted $(C_1-C_{20})$ alkanoic anhydride, a substituted or unsubstituted $(C_1-C_{20})$ alkenoic substituted or unsubstituted $(C_1-C_{20})$ alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, and vinyl sulfonic acid anhydride.

In various embodiments, the at least partially hydrophobically-modified polymer is at least one of a polyacrylamide, a polyacrylic acid (wherein individual units can independently be an acid or a salt or ester thereof), a polymethacrylamide, and a polymethacrylic acid (wherein individual units can independently be an acid or a salt or ester thereof). The at least partially hydrophobically-modified polymer can be a polyacrylamide or a poly(di$(C_1-C_5)$alkylamino$(C_1-C_5)$alkyl $(C_0-C_5)$alkylacrylate. The at least partially hydrophobically-modified polymer can be a polydimethylaminoethyl acrylate.

Emulsifier.

In various embodiments, the diverter composition can further include at least one emulsifier. The at least one emulsifier can be part of the invert emulsion, such that it helps the oil phase and the aqueous phase remain as separate phases until a desired location in the subterranean formation is reached. The one or more emulsifiers can form any suitable proportion of the diverter composition. For example, the one or more emulsifiers can be about 0.001 vol % to about 15 vol % of the invert emulsion, about 0.1 vol % to about 5 vol %, or about 0.001 vol % or less, or about 0.005 vol %, 0.01, 0.05, 0.1, 0.5, 1, 1.5, 2, 2.5, 3, 3.5, 4, 4.5, 5, 6, 7, 8, 9, 10, 11, 12, 13, 14, or about 15 vol % or more of the invert emulsion.

The emulsifier can be any suitable emulsifier, such that the invert emulsion can be formed and used as described herein. For example, the emulsifier can have an HLB (Davies' scale) of about 3 to about 7, or about 3 or less, or about 3.5, 4, 4.5, 5, 5.5, 6, 6.5, or about 7 or more. The emulsifier can be at least one of a carboxylic acid-terminated polyamide (e.g., having fatty $(C_{10}-C_{50})$hydrocarbyl units between the amide units), a substituted or unsubstituted $(C_2-C_{50})$hydrocarbyl-carboxylic acid or a $(C_1-C_{50})$hydrocarbyl ester thereof, and a mono- or poly-(substituted or unsubstituted $(C_2-C_{10})$alkylene) diol having 0, 1, or 2 hydroxy groups etherified with a $(C_1-C_{50})$hydrocarbyl group, wherein each $(C_{10}-C_{50})$hydrocarbyl and $(C_1-C_{50})$hydrocarbyl is independently selected and is independently substituted or unsubstituted, and wherein each $(C_{10}-C_{50})$hydrocarbyl is independently interrupted by 0, 1, 2, or 3 groups selected from —O—, —S—, and substituted or unsubstituted —NH—. The emulsifier can include at least one of a mono- or poly-$(C_2-C_{10})$alkylene diol mono$(C_1-C_{10})$alkyl ether, a $(C_2-C_{30})$alkanoic acid, and a $(C_2-C_{30})$alkenoic acid. The emulsifier can include at least one of acetic acid, ethylene glycol monobutyl ether, diethylene glycol monobutyl ether, a $(C_4-C_{50})$ alpha-olefin, an isomerized $(C_4-C_{50})$ alpha-olefin, ethylene glycol, propylene glycol. In addition to the surfactant or emulsion-stabilizer, the emulsifier can include a solvent, such as at least one of petroleum distillate, hydrotreated petroleum distillate, diesel, naphthalene. In various embodiments, the emulsifier is at least one of LE SUPERMUL™, FORTI-MUL™, EZ MUL® NT, AF-70, and AF-61.

Bridging Agent.

In some embodiments, the composition includes at least one bridging agent. The bridging agent can be included in at least one of the diverter composition, the invert emulsion, the aqueous phase, and the oil phase. In another embodiment, at least one of the diverter composition, the invert emulsion, the aqueous phase, and the oil phase, is free of a bridging agent. A bridging agent is any solid added to the diverter composition that can bridge across a pore throat or fracture to effectively build a filter cake to prevent or reduce loss of fluids therethrough. In various embodiments, the diverter composition has enhanced solids transportation characteristics due at least to the one or more rheological modifier, which can allow the diverter composition to optionally include any suitable amount and type of bridging agents. In some examples, bridging materials can provide diversion in extreme scenarios, such as highly naturally fractured carbonate reservoirs.

The one or more bridging agents can form any suitable proportion of the diverter composition, such as the invert emulsion, the aqueous phase, the oil phase, or a combination thereof. For example, the one or more bridging agents can be about 0.001 wt % to about 90 wt % of the diverter composition, about 0.01 wt % to about 60 wt %, about 0.1 wt % to about 30 wt %, or about 0.001 wt % or less, or about 0.01 wt %, 0.1, 1, 2, 3, 4, 5, 10, 15, 20, 25, 30, 35, 40, 45, 50, 55, 60, 65, 70, 75, 80, 85 wt %, or about 90 wt % of the diverter composition or more, such as of the invert emulsion, the aqueous phase, the oil phase, or a combination thereof. For example, the one or more bridging agents can be present in the diverter composition in a concentration of about 0.10 g/L to about 60 g/L of the composition, or about 0.50 g/L to about 30 g/L, or about 0.1 g/L or less, or about 0.25 g/L, 0.5, 1, 2, 3, 4, 5, 10, 15, 20, 30, 40, 50, 55, or about 60 g/L or more of the diverter composition.

The bridging agent can include any suitable material. The bridging agent can be at least one of fibers and particles. A bridging agent can include one compound or multiple compounds. Each particle or fiber of the bridging agent can include one compound or more than one compound. The particles can have any suitable shape; for example, the particles can be at least one of platelets, shavings, flakes, ribbons, rods, strips, spheroids, toroids, pellets, and tablets. The bridging agent can be a salt, an oil-soluble resin, mica, nutshell. The bridging agent can be degradable, such as biodegradable, self-degradable, water soluble, or oil-soluble. In some embodiments, the bridging agent can be degradable, substantially non-self-degradable, or substantially non-degradable. In some examples, the bridging agent can be degradable, and the degradability of the bridging agent can be self-degradability (e.g., degrades as a result of the influence of elements naturally present in the downhole formation over a suitable period of time), or can be inducible degradability (e.g., triggerable, such as by at least one of allowing time to pass, heating, vibrating, changing surrounding pH, changing surrounding salinity, and changing the chemical environment). A degradable bridging agent can be at least one of physically degradable (e.g., loses physical integrity, such that disintegration into smaller materials occurs), chemically degradable (e.g., breakage of bonds or transformation into a different compound, such as cleavage of intramolecular or intermolecular bonds), or dissolvably degradable (e.g., at least part of the material dissolves in the surrounding solution; the dissolution can contribute to or be contributed to by physical degradation). The bridging agent can be BioVert® NWB.

The bridging agent can be, for example, at least one of vegetable fibers or particles (e.g., cotton, hemp, jute, flax, ramie, sisal, bagasse), wood fibers or particles (e.g., from tree sources), human or animal fibers, mineral fibers or particles (e.g., asbestos, wollastonite, palygorskite), metallic fibers or particles (e.g., copper, nickel, aluminum), carbon fibers or particles, silicon carbide fibers or particles, fiberglass fibers or particles, cellulose fibers or particles, and polymer fibers or particles. Examples of polymer fibers and particles can include nylon, polyethylene terephthalate, poly (vinyl alcohol), polyolefin (e.g., polyethylene or polypropylene), acrylic polyester, aromatic polyamide, elastomeric polymer, and polyurethane. In some embodiments, the fibers or particles include at least one of a polyamide, a polyethylene, a polypropylene, and a glass (e.g., alkali-resistant glass, or non-alkali-resistant glass).

In various embodiments, the bridging agent can include at least one of a sizing agent, a coupling agent, a lubricant, an antistatic agent, an emulsifier, a wetting agent, and an antioxidant. In some embodiments, the one or more bridging agents can include a sizing agent, such as any suitable sizing agent. The sizing agent can coat any suitable proportion of the outside of one or more fibers or particles. In some embodiments, the sizing agent can be a lipophilic sizing agent. A lipophilic sizing agent can give the fibers or particles improved compatibility with, and dispersability in, fluids such as non-aqueous fluids such as oil-base fluids, synthetic-base fluids, invert-emulsion-base fluids, or combinations thereof. The lipophilic sizing agent can be non-polymeric. In some embodiments, the lipophilic sizing agent can be at least one of acetic anhydride, n-alkenyl isocyanate, a titanate, trichloro-s-triazine, and organosilanes having the structure (substituted or unsubstituted $(C_1-C_{30})$hydrocarbyl)-Si—$X_3$, wherein X is independently selected from the group consisting of Cl, OMe, and OEt. In some embodiments, the lipophilic sizing agent is a lipophilic film-forming polymer. The lipophilic film-forming polymer can be at least one of a polyurethane, polystyrene, polyvinyl chloride, a polyolefin, a polyester, an epoxy resin, and copolymers thereof.

The fibers can have any suitable length. For example, the fibers can have a length of about 2 mm to about 30 mm, or about 6 mm to about 25 mm, or about 2 mm or less, or about 3, 4, 5, 6, 7, 8, 9, 10, 11, 12, 13, 14, 15, 16, 17, 18, 19, 20, 21, 22, 23, 24, 25, 26, 27, 28, 29, or about 30 mm or more. The fibers or particles can have any suitable diameter (wherein diameter is the largest dimension for non-spherical particles). For example, the fibers or particles can have a diameter (or largest dimension, for particles) of about 1 μm to about 0.5 mm, or about 10 μm to about 200 μm, or about 1 μm or less, 2.5, 5, 7.5, 10, 20, 30, 40, 50, 60, 70, 80, 90, 100, 110, 120, 130, 140, 150, 160, 170, 180, 190, 200 μm, 0.3 mm, 0.4 mm, or about 0.5 mm or more.

The fibers or particles can have any suitable density. Fibers or particles having densities near to the densities of the diverter composition can be used to help provide a well-distributed and stable slurry. For example, the fibers or particles can have a density of about 0.5 g/cm$^3$ to about 5 g/cm$^3$, or about 1 g/cm$^3$ to about 4 g/cm$^3$, or about 0.5 g/cm$^3$ or less, or about 0.6 g/cm$^3$, 0.7, 0.8, 0.9, 1, 1.1, 1.2, 1.3, 1.4, 1.5, 1.6, 1.7, 1.8, 1.9, 2.0, 2.2, 2.5, 2.7, 3.0, 3.5, 4, or about 5 g/cm$^3$ or more.

Other Components.

The diverter composition including the invert emulsion, or a mixture including the diverter composition, can include any suitable additional component in any suitable proportion, such that the invert emulsion, composition, or mixture including the same, can be used as described herein.

In some embodiments, the diverter composition includes one or more viscosifiers. The viscosifier can be any suitable viscosifier. The viscosifier can affect the viscosity of the diverter composition or a solvent that contacts the diverter composition at any suitable time and location. In some embodiments, the viscosifier provides an increased viscosity at least one of before injection into the subterranean formation, at the time of injection into the subterranean formation, during travel through a tubular disposed in a borehole, once the diverter composition reaches a particular subterranean location, or some period of time after the diverter composition reaches a particular subterranean location. In some embodiments, the viscosifier can be about 0.000,1 wt % to about 10 wt % of the diverter composition, about 0.004 wt % to about 0.01 wt % of the diverter composition, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more of the diverter composition.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, derivatized starch, tamarind, tragacanth, guar gum, derivatized guar (e.g., hydroxypropyl guar, carboxy methyl guar, or carboxymethyl hydroxypropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstitued ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the diverter composition can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-

$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$)alkyl ether (e.g., pentaerythritol allyl ether), and a poly($C_2$-$C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the diverter composition, about 0.001 wt % to about 0.01 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or 5 wt % or more.

In some embodiments, the diverter composition can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^+$ salt of a persulfate, percarbonate, perborate, peroxide, perphosphate, permanganate, chlorite, or hyporchlorite ion. An enzymatic breaker can be at least one of an alpha or beta amylase, amyloglucosidase, oligoglucosidase, invertase, maltase, cellulase, hemicellulase, and mannanohydrolase. The breaker can be about 0.001 wt % to about 30 wt % of the diverter composition, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The diverter composition, or a mixture including the diverter composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the diverter composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The diverter composition including the invert emulsion or a mixture including the same can include any suitable downhole fluid. The diverter composition including the invert emulsion can be combined with any suitable downhole fluid before, during, or after the placement of the diverter composition in the subterranean formation or the contacting of the diverter composition and the subterranean material. In some examples, the diverter composition including the invert emulsion is combined with a downhole fluid above the surface, and then the combined composition is placed in a subterranean formation or contacted with a subterranean material. In another example, the diverter composition including the invert emulsion is injected into a subterranean formation to combine with a downhole fluid, and the combined composition is contacted with a subterranean material or is considered to be placed in the subterranean formation. The placement of the diverter composition in the subterranean formation can include contacting the subterranean material and the mixture. Any suitable weight percent of the diverter composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the diverter composition or mixture including the same.

In some embodiments, the diverter composition, or a mixture including the same, can include any suitable amount of any suitable material used in a downhole fluid. For example, the diverter composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the diverter composition or a mixture thereof can include additives for high temperature high pressure control (HTHP) and emulsion stability (for example, additives having the tradename FACTANT™ (highly concentrated tall oil derivative)) or additives to provide thinning (for example, an additive having the tradename DRILTREAT® (lecithin liquid dispersion)). In various embodiments, the diverter composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the diverter composition or a mixture including the same can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPER-MEX®, FILTERCHEK™, DEXTRID®, CARBONOX®, and BARANEX® filtration control agents; PERFORMA-TROL®, GEM™, EZ-MUD®, CLAY GRABBER®, CLAYSEAL®, CRYSTAL-DRIL®, and CLAY SYNC™ II shale stabilizers; NXS-LUBE™, EP MUDLUBE®, and DRIL-N-SLIDE™ lubricants; QUIK-THIN®, IRON-THIN™, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BAROFIBRE™, STEELSEAL®, and HYDRO-PLUG® lost circulation management materials. Any suitable proportion of the diverter composition or mixture including the diverter composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the diverter composition or mixture.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the mixture with the diverter composition including the invert emulsion in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more of the mixture.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The diverter composition including the invert emulsion can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the diverter composition. For example, the diverter composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the diverter composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 mm to about 2.36 mm. In some embodiments, the proppant can have a distribution of particle sizes clustering around multiple averages, such as one, two, three, or four different average particle sizes. The diverter composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

Drilling Assembly.

In various embodiments, the diverter composition including the invert emulsion disclosed herein can directly or indirectly affect one or more components or pieces of equipment associated with the preparation, delivery, recapture, recycling, reuse, and/or disposal of the disclosed composition including the invert emulsion. For example, and with reference to FIG. 1, the disclosed composition including the invert emulsion can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The diverter composition including the invert emulsion can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the diverter composition including the invert emulsion can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the diverter composition including the invert emulsion can be stored, reconditioned, and/or regulated until added to the drilling fluid 122.

As mentioned above, the diverter composition including the invert emulsion can directly or indirectly affect the components and equipment of the drilling assembly 100. For example, the diverter composition including the invert emulsion can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the diverter composition including the invert emulsion.

The diverter composition including the invert emulsion can directly or indirectly affect the pump 120, which representatively includes any conduits, pipelines, trucks, tubulars, and/or pipes used to fluidically convey the diverter composition including the invert emulsion to the subterranean formation, any pumps, compressors, or motors (e.g., topside or downhole) used to drive the diverter composition into motion, any valves or related joints used to regulate the pressure or flow rate of the diverter composition, and any sensors (e.g., pressure, temperature, flow rate, and the like), gauges, and/or combinations thereof, and the like. The diverter composition including the invert emulsion can also directly or indirectly affect the mixing hopper 134 and the retention pit 132 and their assorted variations.

The diverter composition including the invert emulsion can also directly or indirectly affect the various downhole or subterranean equipment and tools that can come into contact with the diverter composition including the invert emulsion such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The diverter composition including the invert emulsion can also directly or indirectly affect any downhole heat exchangers, valves and corresponding actuation devices, tool seals, packers and other wellbore isolation devices or components, and the like associated with the wellbore 116. The diverter composition including the invert emulsion can also directly or indirectly affect the drill bit 114, which can include roller cone bits, polycrystalline diamond compact (PDC) bits, natural diamond bits, any hole openers, reamers, coring bits, and the like.

While not specifically illustrated herein, the diverter composition including the invert emulsion can also directly or indirectly affect any transport or delivery equipment used to convey the diverter composition including the invert emulsion to the drilling assembly 100 such as, for example, any transport vessels, conduits, pipelines, trucks, tubulars, and/or pipes used to fluidically move the diverter composition including the invert emulsion from one location to another, any pumps, compressors, or motors used to drive the diverter composition into motion, any valves or related joints used to regulate the pressure or flow rate of the diverter composition, and any sensors (e.g., pressure and temperature), gauges, and/or combinations thereof, and the like.

System or Apparatus.

In various embodiments, the present invention provides a system. The system can be any suitable system that can use or that can be generated by use of an embodiment of the diverter composition described herein in a subterranean formation, or that can perform or be generated by performance of a method for using the diverter composition described herein. The system can include a composition including the invert emulsion. The system can also include a subterranean formation including the diverter composition therein. In some embodiments, the diverter composition in the system can also include a downhole fluid, or the system can include a mixture of the diverter composition and downhole fluid. In some embodiments, the system can include a tubular, and a pump configured to pump the diverter composition into the subterranean formation through the tubular.

Various embodiments provide systems and apparatus configured for delivering the diverter composition described herein to a subterranean location and for using the diverter composition therein, such as for a stimulation operation, a drilling operation, or a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing a diverter composition including the invert emulsion described herein.

In some embodiments, the system can include a drill string disposed in a wellbore, with the drill string including a drill bit at a downhole end of the drill string. The system can also include an annulus between the drill string and the wellbore. The system can also include a pump configured to circulate the diverter composition through the drill string, through the drill bit, and back above-surface through the annulus. In some embodiments, the system can include a fluid processing unit configured to process the diverter composition exiting the annulus to generate a cleaned drilling fluid for recirculation through the wellbore.

In various embodiments, the present invention provides an apparatus. The apparatus can be any suitable apparatus that can use or that can be generated by use of the diverter composition including the invert emulsion described herein in a subterranean formation, or that can perform or be generated by performance of a method for using the diverter composition including the invert emulsion described herein. The apparatus can include a pump configured to pump an embodiment of the diverter composition into a subterranean formation through a tubular.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the diverter composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the diverter composition to the high pressure pump. In such embodiments, the low pressure pump can "step up" the pressure of the diverter composition before it reaches the high pressure pump.

In some embodiments, the systems or apparatuses described herein can further include a mixing tank that is upstream of the pump and in which the diverter composition is formulated. In various embodiments, the pump (e.g., a low pressure pump, a high pressure pump, or a combination thereof) can convey the diverter composition from the mixing tank or other source of the diverter composition to the tubular. In other embodiments, however, the diverter composition can be formulated offsite and transported to a worksite, in which case the diverter composition can be introduced to the tubular via the pump directly from its shipping container (e.g., a truck, a railcar, a barge, or the like) or from a transport pipeline. In either case, the diverter composition can be drawn into the pump, elevated to an appropriate pressure, and then introduced into the tubular for delivery to the subterranean formation.

Figure 2:
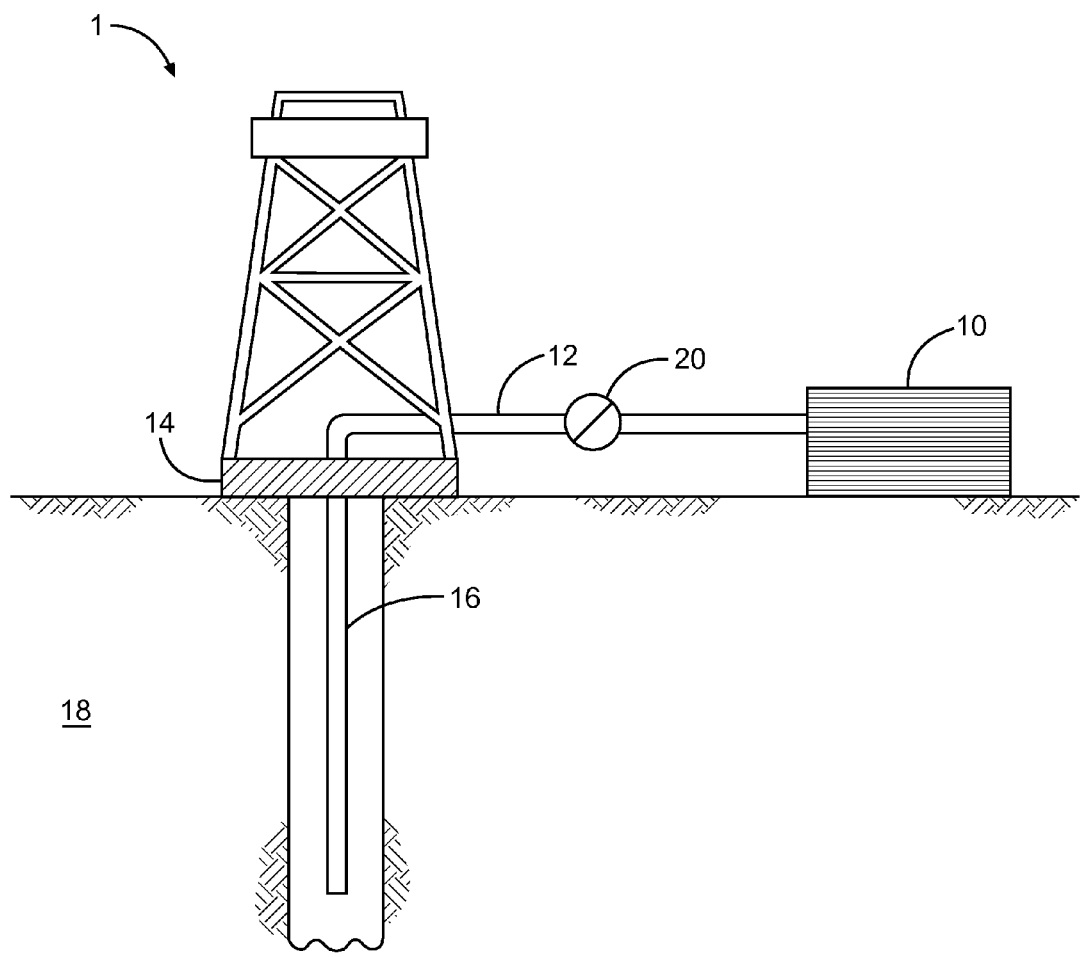
FIG. 2 illustrates a system or apparatus for delivering a diverter composition to a subterranean formation, in accordance with various embodiments.

FIG. 2 shows an illustrative schematic of systems and apparatuses that can deliver embodiments of the diverter compositions of the present invention to a subterranean location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the diverter composition can be formulated. The diverter composition can be conveyed via line 12 to wellhead 14, where the diverter composition enters tubular 16, with tubular 16 extending from wellhead 14 into subterranean formation 18. Upon being ejected from tubular 16, the diverter composition can subsequently penetrate into subterranean formation 18. Pump 20 can be configured to raise the pressure of the diverter composition to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the diverter composition can, in some embodiments, flow back to wellhead 14 and exit subterranean formation 18. The diverter composition that flows back can be substantially diminished in the concentration of the invert emulsion therein. In some embodiments, the diverter composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the diverter composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Composition for Treatment of a Subterranean Formation.

Various embodiments provide a diverter composition for treatment of a subterranean formation. The diverter composition can be any suitable composition that can be used to perform an embodiment of the method for treatment of a subterranean formation described herein. For example, the diverter composition can include an invert emulsion that includes a continuous oil phase including at least one rheological modifier. The invert emulsion can also include an internal aqueous phase. In some embodiments, the diverter composition further includes a downhole fluid. The downhole fluid can be any suitable downhole fluid, such as an acidizing fluid, a drilling fluid, or a fracturing fluid.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a diverter composition including an invert emulsion that includes a continuous oil phase including at least one rheological modifier. The invert emulsion can also include an internal aqueous phase.

EXAMPLES

Various embodiments of the present invention can be better understood by reference to the following Examples which are offered by way of illustration. The present invention is not limited to the Examples given herein.

Example 1. Preparation of Samples

Sample 1 was prepared and blended, having the composition described in Table 1.

TABLE 1

Sample 1 composition.

| Additive | Quantity |
|---|---|
| Fresh water | 633.40 gals |
| BDF-571 | 2 gals |
| BDF-570 | 8 gals |
| EZ MUL ® NT | 25 gals |
| KCl | 524 lbs |
| XP-07 ™ | 300 gals |

EZ MUL® NT is ethylene glycol monobutyl ether, diethylene glycol monobutyl ether, hydrotreated light petroleum distillate. XP07™ is a normal alkane mixture that is a synthetic paraffin base fluid. Sample 2 was prepared identically to Sample 1, but having 1 gal BDF-571 and 4 gals BDF-570. Sample 3 was prepared identically to Sample 1, but having 0.5 gal BDF-571 and 2 gals BDF-570. Comparative samples 1 and 2 were also prepared, a borate-crosslinked solution of 25 lb guar/1000 gal water with a comparative sample 1 having pH 9 and comparative sample 2 having pH 10.

Example 2. Viscosity and Dynamic Properties of Samples

Viscosity and dynamic properties of Samples 1-3 and the comparative sample were measured using an Anton Paar MCR 501 rheometer using a sandblasted cone-and-plate and a vane fixture for testing invert emulsion systems, using a temperature of 140° F. The measurements on the control sample were conducted with a standard couette on the MCR 501.

Figure 3:
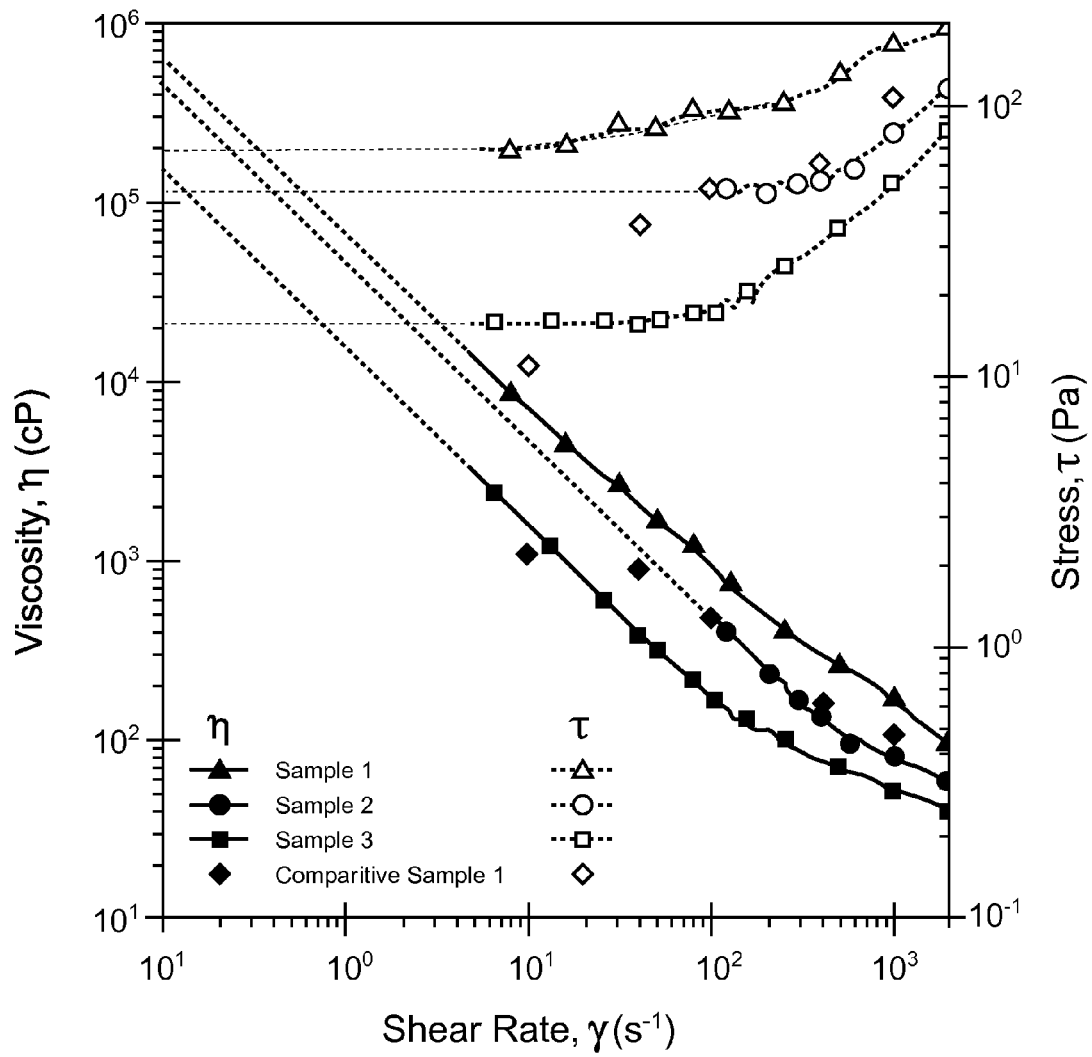
FIG. 3 illustrates viscosity versus shear rate of Samples 1-3 and comparative sample 1, in accordance with various embodiments.

FIG. 3 illustrates viscosity versus shear rate of Sample 1 and the comparative sample. The data illustrates that high levels of Sample 1-3's internal structure can be achieved.

Figure 4A:
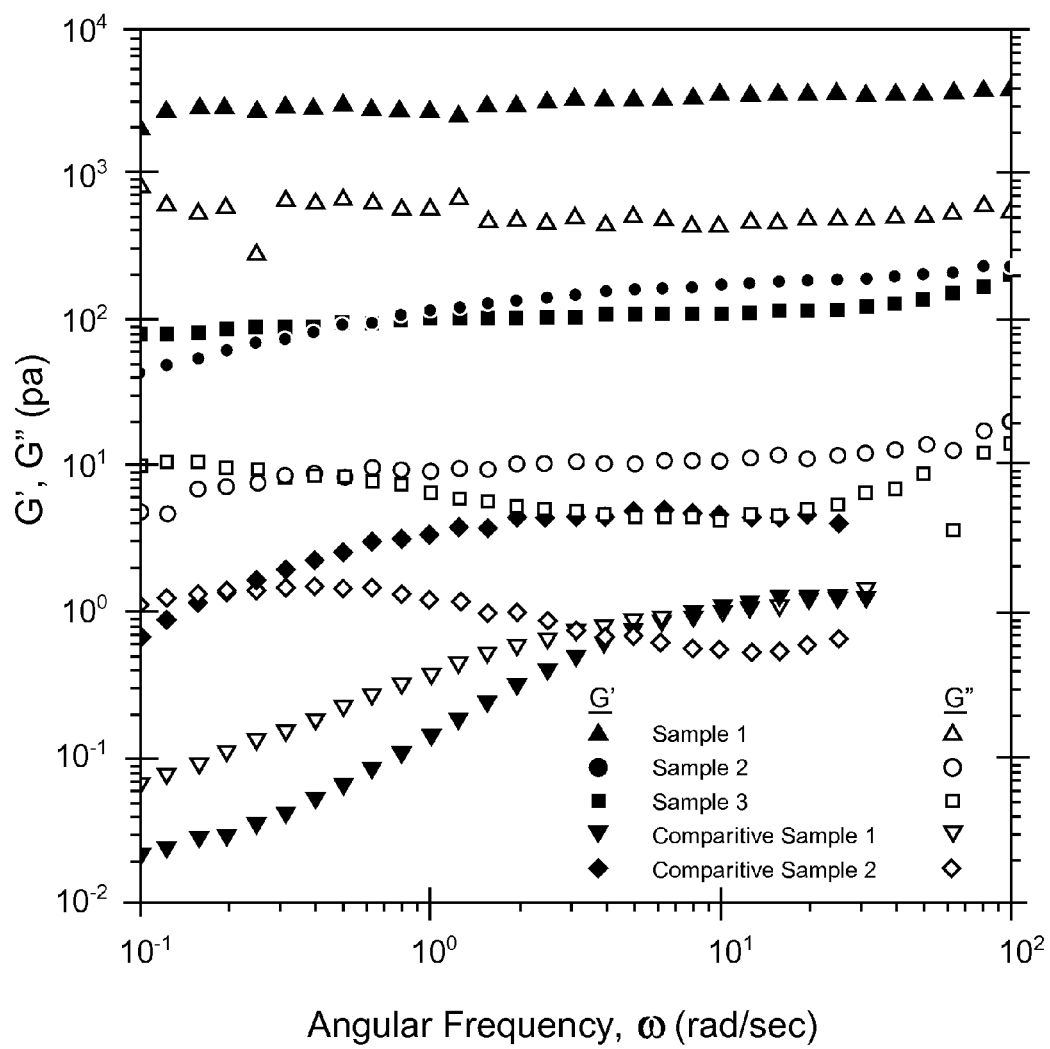
FIG. 4A illustrates the elastic modulus G' and the viscous modulus G" versus angular frequency for Samples 1-3 and comparative samples 1-2, in accordance with various embodiments.
Figure 4B:
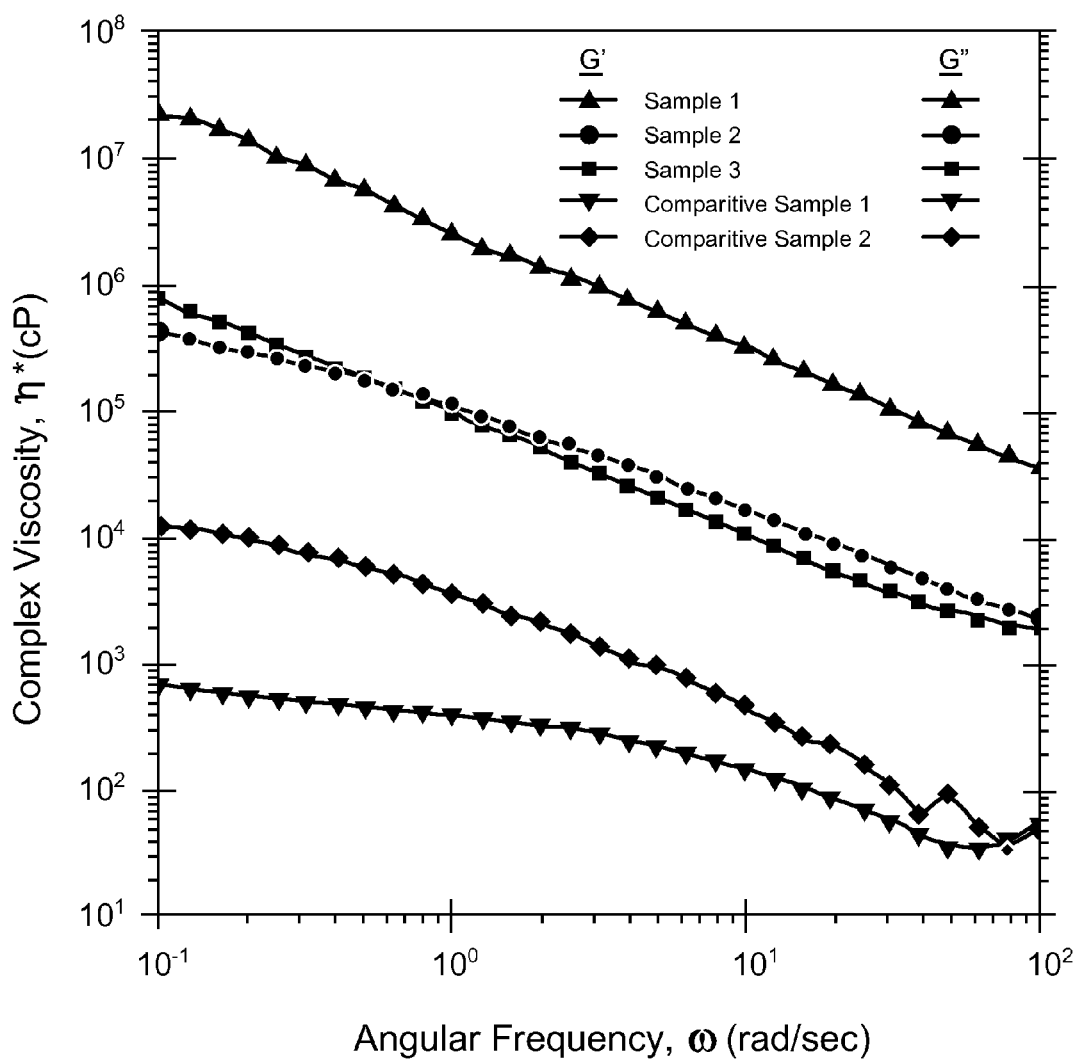
FIG. 4B illustrates the complex viscosity versus angular frequency for Samples 1-3 and comparative samples 1-2, in accordance with various embodiments.

FIG. 4A illustrates the elastic modulus G' and the viscous modulus G" versus angular frequency for Samples 1-3 and comparative samples 1-2, in accordance with various embodiments. FIG. 4B illustrates the complex viscosity versus angular frequency for Samples 1-3 and comparative samples 1-2, in accordance with various embodiments.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

ADDITIONAL EMBODIMENTS

The following exemplary embodiments are provided, the numbering of which is not to be construed as designating levels of importance:

Embodiment 1 provides a method of treating a subterranean formation, the method comprising:
placing in a subterranean formation a diverter composition comprising an invert emulsion comprising
a continuous oil phase comprising at least one rheological modifier; and
an internal aqueous phase.

Embodiment 2 provides the method of Embodiment 1, further comprising obtaining or providing the diverter composition, wherein the obtaining or providing of the diverter composition occurs above-surface.

Embodiment 3 provides the method of any one of Embodiments 1-2, further comprising obtaining or providing the diverter composition, wherein the obtaining or providing of the diverter composition occurs in the subterranean formation.

Embodiment 4 provides the method of any one of Embodiments 1-3, wherein placing the diverter composition in the subterranean formation comprises placing the diverter composition in at least one of a wellbore, a fracture, and a flow pathway.

Embodiment 5 provides the method of any one of Embodiments 1-4, wherein the method is a method of acidizing.

Embodiment 6 provides the method of any one of Embodiments 1-5, further comprising adding the rheological modifier to the invert emulsion to prepare the diverter composition on-the-fly.

Embodiment 7 provides the method of Embodiment 6, further comprising adjusting at least one of concentration of and type of the rheological modifier in reaction to monitored conditions downhole.

Embodiment 8 provides the method of any one of Embodiments 1-7, wherein the emulsion breaks in the subterranean formation, such that the internal aqueous phase contacts the subterranean formation.

Embodiment 9 provides the method of Embodiment 8, wherein the contacting of the aqueous phase and the subterranean formation reduces permeability of the contacted subterranean formation to aqueous liquids by about 1% to about 100%.

Embodiment 10 provides the method of any one of Embodiments 8-9, wherein the contacting of the aqueous phase and the subterranean formation reduces permeability of the contacted subterranean formation to aqueous liquids by about 70% to about 95%.

Embodiment 11 provides the method of any one of Embodiments 8-10, wherein the contacting of the aqueous phase and the subterranean formation reduces permeability of the contacted subterranean formation to oil by about 1% to about 100%.

Embodiment 12 provides the method of any one of Embodiments 8-11, wherein the contacting of the aqueous phase and the subterranean formation reduces permeability of the contacted subterranean formation to oil by about 30% to about 70%.

Embodiment 13 provides the method of any one of Embodiments 8-12, wherein the contacting of the aqueous phase and the subterranean formation reduces permeability of the contacted subterranean formation to oil by less than the contacting of the aqueous phase and the subterranean formation reduces permeability of the contacted subterranean formation to aqueous liquids.

Embodiment 14 provides the method of any one of Embodiments 1-13, wherein the aqueous phase is about 1 vol % to about 99 vol % of the invert emulsion.

Embodiment 15 provides the method of any one of Embodiments 1-14, wherein the aqueous phase is about 50 vol % to about 90 vol % of the invert emulsion.

Embodiment 16 provides the method of any one of Embodiments 1-15, wherein the aqueous phase comprises at least one of brine, produced water, flowback water, brackish water, and sea water.

Embodiment 17 provides the method of any one of Embodiments 1-16, wherein the aqueous phase has a total dissolved solids level of about 1,000 mg/L to about 250,000 mg/L.

Embodiment 18 provides the method of any one of Embodiments 1-17, wherein the aqueous phase comprises at least one of NaBr, $CaCl_2$, $CaBr_2$, $ZnBr_2$, KCl, and NaCl.

Embodiment 19 provides the method of any one of Embodiments 1-18, wherein the aqueous phase has a pH of about 7.

Embodiment 20 provides the method of any one of Embodiments 1-19, wherein the aqueous phase has a pH of about −2 to about 6.5.

Embodiment 21 provides the method of any one of Embodiments 1-20, wherein the aqueous phase comprises at least one of HCl, $H_2SO_4$, HF, acetic acid, and formic acid.

Embodiment 22 provides the method of any one of Embodiments 1-21, wherein the internal aqueous phase comprises at least one internal active agent.

Embodiment 23 provides the method of Embodiment 22, wherein the internal active agent is a diverting agent.

Embodiment 24 provides the method of any one of Embodiments 22-23, wherein upon contacting the subterranean formation, the internal active agent reduces permeability of the subterranean formation to water while optionally reducing permeability of the subterranean formation to oil, wherein the reduction in permeability to water is greater than the reduction in permeability to oil.

Embodiment 25 provides the method of any one of Embodiments 22-24, wherein the internal active agent comprises a polymer that is at least partially hydrophobically modified, wherein the hydrophobic modification is independently a $(C_4-C_{50})$ substituted or unsubstituted hydrocarbyl group interrupted by 0, 1, 2, or 3 groups chosen from —O—, —S—, and substituted or unsubstituted —NH—.

Embodiment 26 provides the method of Embodiment 25, wherein the internal active agent comprises a polymer comprising a repeating unit that is a carboxylic acid- or amide-substituted ethylene unit, wherein each ethylene unit is independently further unsubstituted or further substituted, wherein each carboxylic acid and amide substituent is independently directly substituted on the ethylene unit or substituted via a linker that is a $(C_1-C_{10})$ substituted or unsubstituted hydrocarbyl interrupted by 0, 1, 2, or 3 groups chosen from —O—, —S—, and substituted or unsubstituted —NH—, wherein each amide substituent is independently unmodified or is hydrophobically modified, wherein each carboxylic acid substituent is independently unmodified, is a salt thereof, or is hydrophobically modified.

Embodiment 27 provides the method of any one of Embodiments 25-26, wherein the partially hydrophobically-modified polymer comprises a repeating unit that is formed from vinyl alcohol, acrylic acid, acrylamide, methacrylic acid, methacrylamide, vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, and vinyl sulfonic acid anhydride.

Embodiment 28 provides the method of any one of Embodiments 25-27, wherein the at least partially hydrophobically-modified polymer is at least one of polyacrylamide, polyacrylic acid, polymethacrylamide, and polymethacrylic acid.

Embodiment 29 provides the method of any one of Embodiments 25-28, wherein the at least partially hydrophobically-modified polymer is a polyacrylamide or a poly(di($C_1-C_5$)alkylamino($C_1-C_5$)alkyl ($C_0-C_5$)alkylacrylate.

Embodiment 30 provides the method of any one of Embodiments 25-29, wherein the at least partially hydrophobically-modified polymer is a polydimethylaminoethyl acrylate.

Embodiment 31 provides the method of any one of Embodiments 25-30, wherein the hydrophobic modification is independently a $(C_{10}-C_{30})$ hydrocarbyl group.

Embodiment 32 provides the method of any one of Embodiments 25-31, wherein the hydrophobic modification is independently a $(C_{10}-C_{30})$ alkyl group.

Embodiment 33 provides the method of any one of Embodiments 1-32, wherein the aqueous phase comprises at least one bridging agent.

Embodiment 34 provides the method of Embodiment 33, wherein the bridging agent comprises at least one of fibers and particles.

Embodiment 35 provides the method of any one of Embodiments 33-34, wherein the bridging agent comprises a biodegradable material.

Embodiment 36 provides the method of any one of Embodiments 1-35, wherein the oil phase is about 1 vol % to about 99 vol % of the invert emulsion.

Embodiment 37 provides the method of any one of Embodiments 1-36, wherein the oil phase is about 10 vol % to about 50 vol % of the invert emulsion.

Embodiment 38 provides the method of any one of Embodiments 1-37, wherein the oil phase comprises at least one of diesel, kerosene, naptha, an organic solvent, and a paraffin.

Embodiment 39 provides the method of any one of Embodiments 1-38, wherein the rheological modifier comprises at least one of a viscosifier and an elastifier.

Embodiment 40 provides the method of any one of Embodiments 1-39, wherein the rheological modifier is at least one of a mono- or poly-(substituted or unsubstituted ($C_2$-$C_{10}$)alkylene) diol having 0, 1, or 2 hydroxy groups etherified with a ($C_1$-$C_{50}$)hydrocarbyl group, a clay, a silica, and a di- or tri-($C_{10}$-$C_{50}$)hydrocarbylamine, wherein each ($C_{10}$-$C_{50}$)hydrocarbyl and ($C_1$-$C_{50}$)hydrocarbyl is independently selected and is independently substituted or unsubstituted, and wherein each ($C_{10}$-$C_{50}$)hydrocarbyl is independently interrupted by 0, 1, 2, or 3 groups selected from —O—, —S—, and substituted or unsubstituted —NH—.

Embodiment 41 provides the method of any one of Embodiments 1-40, wherein the rheological modifier is at least one of a di- or tri-($C_{30}$-$C_{50}$)hydrocarbylamine, and a mono- or poly-($C_2$-$C_{10}$)alkylene diol mono($C_1$-$C_{10}$)alkyl ether.

Embodiment 42 provides the method of any one of Embodiments 1-41, wherein the rheological modifier is (12E,15E)-N-[(21E,24E)-hexatriaconta-21,24-dien-1-yl]hexatriaconta-12,15-dien-1-amine.

Embodiment 43 provides the method of any one of Embodiments 1-42, wherein the rheological modifier is dipropylene glycol monomethyl ether.

Embodiment 44 provides the method of any one of Embodiments 1-43, wherein the rheological modifier is about 0.001 vol % to about 10 vol % of the invert emulsion.

Embodiment 45 provides the method of any one of Embodiments 1-44, wherein the rheological modifier is about 0.1 vol % to about 2 vol % of the invert emulsion.

Embodiment 46 provides the method of any one of Embodiments 1-45, wherein the diverter composition further comprises at least one emulsifier.

Embodiment 47 provides the method of Embodiment 46, wherein the emulsifier has an HLB (Davies' scale) of about 3 to about 7.

Embodiment 48 provides the method of any one of Embodiments 46-47, wherein the emulsifier is at least one of a carboxylic acid-terminated polyamide, a substituted or unsubstituted ($C_2$-$C_{50}$)hydrocarbyl-carboxylic acid or a ($C_1$-$C_{50}$)hydrocarbyl ester thereof, and a mono- or poly-(substituted or unsubstituted ($C_2$-$C_{10}$)alkylene) diol having 0, 1, or 2 hydroxy groups etherified with a ($C_1$-$C_{50}$)hydrocarbyl group, wherein each ($C_{10}$-$C_{50}$)hydrocarbyl and ($C_1$-$C_{50}$)hydrocarbyl is independently selected and is independently substituted or unsubstituted, and wherein each ($C_{10}$-$C_{50}$)hydrocarbyl is independently interrupted by 0, 1, 2, or 3 groups selected from —O—, —S—, and substituted or unsubstituted —NH—.

Embodiment 49 provides the method of any one of Embodiments 46-48, wherein the emulsifier comprises at least one of a mono- or poly-($C_2$-$C_{10}$)alkylene diol mono($C_1$-$C_{10}$)alkyl ether, a ($C_2$-$C_{30}$)alkanoic acid, and a ($C_2$-$C_{30}$)alkenoic acid.

Embodiment 50 provides the method of any one of Embodiments 46-49, wherein the emulsifier comprises at least one of acetic acid, ethylene glycol monobutyl ether, diethylene glycol monobutyl ether, a ($C_4$-$C_{50}$) alpha-olefin, an isomerized ($C_4$-$C_{50}$) alpha-olefin, ethylene glycol, propylene glycol.

Embodiment 51 provides the method of any one of Embodiments 46-50, wherein the emulsifier comprises at least one of petroleum distillate, hydrotreated petroleum distillate, diesel, naphthalene.

Embodiment 52 provides the method of any one of Embodiments 46-51, wherein the emulsifier is about 0.001 vol % to about 15 vol % of the invert emulsion.

Embodiment 53 provides the method of any one of Embodiments 46-52, wherein the emulsifier is about 0.1 vol % to about 5 vol % of the invert emulsion.

Embodiment 54 provides the method of any one of Embodiments 1-53, further comprising combining the diverter composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing the diverter composition in the subterranean formation comprises placing the mixture in the subterranean formation.

Embodiment 55 provides the method of any one of Embodiments 1-54, wherein the diverter composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 56 provides the method of any one of Embodiments 1-55, wherein the diverter composition further comprises a proppant, a resin-coated proppant, or a combination thereof.

Embodiment 57 provides the method of any one of Embodiments 1-56, wherein the placing of the diverter composition in the subterranean formation comprises pumping the diverter composition through a tubular disposed in a wellbore and into the subterranean formation.

Embodiment 58 provides the method of any one of Embodiments 1-57, wherein the placing of the diverter composition in the subterranean formation comprises pumping the diverter composition through a drill string disposed in a wellbore, through a drill bit at a downhole end of the drill string, and back above-surface through an annulus.

Embodiment 59 provides the method of Embodiment 58, further comprising processing the diverter composition exiting the annulus with at least one fluid processing unit to generate a cleaned composition and recirculating the cleaned composition through the wellbore.

Embodiment 60 provides a system for performing the method of any one of Embodiments 1-59, the system comprising:
  a tubular disposed in the subterranean formation; and
  a pump configured to pump the diverter composition in the subterranean formation through the tubular.

Embodiment 61 provides a system for performing the method of any one of Embodiments 1-59, the system comprising:
  a drill string disposed in a wellbore, the drill string comprising a drill bit at a downhole end of the drill string;
  an annulus between the drill string and the wellbore; and a pump configured to circulate the diverter composition through the drill string, through the drill bit, and back above-surface through the annulus.

Embodiment 62 provides a method of treating a subterranean formation, the method comprising:
placing in a subterranean formation a diverter composition comprising an invert emulsion comprising
about 10 vol % to about 50 vol % of a continuous oil phase comprising at least one rheological modifier comprising at least one of a mono- or poly-(substituted or unsubstituted ($C_2$-$C_{10}$)alkylene) diol having 0, 1, or 2 hydroxy groups etherified with a ($C_1$-$C_{50}$) hydrocarbyl group, a clay, a silica, and a di- or tri-($C_{10}$-$C_{50}$)hydrocarbylamine, wherein each ($C_{10}$-$C_{50}$)hydrocarbyl and ($C_1$-$C_{50}$)hydrocarbyl is independently selected and is independently substituted or unsubstituted, and wherein each ($C_{10}$-$C_{50}$)hydrocarbyl is independently interrupted by 0, 1, 2, or 3 groups selected from —O—, —S—, and substituted or unsubstituted —NH—, wherein the rheological modifier is about 0.001 vol % to about 10 vol % of the invert emulsion; and
about 50 vol % to about 90 vol % of an internal aqueous phase comprising an internal active agent comprising at least one of a bridging agent and a polymer comprising a repeating unit that is a carboxylic acid- or amide-substituted substituted or unsubstituted ethylene unit, wherein each ethylene unit is independently further unsubstituted or further substituted, wherein each carboxylic acid and amide substituent is independently directly substituted on the ethylene unit or substituted via a linker that is a ($C_1$-$C_{10}$) substituted or unsubstituted hydrocarbyl interrupted by 0, 1, 2, or 3 groups chosen from —O—, —S—, and substituted or unsubstituted —NH—, wherein each amide substituent is independently unmodified or is hydrophobically modified, wherein each carboxylic acid substituent is independently unmodified, is a salt thereof, or is hydrophobically modified, wherein the hydrophobic modification is independently a ($C_4$-$C_{50}$) substituted or unsubstituted hydrocarbyl group interrupted by 0, 1, 2, or 3 groups chosen from —O—, —S—, and substituted or unsubstituted —NH—;
wherein about 0.001 vol % to about 15 vol % of the invert emulsion is one or more emulsifiers.

Embodiment 63 provides a system comprising:
a diverter composition comprising an invert emulsion comprising
a continuous oil phase comprising at least one rheological modifier; and
an internal aqueous phase; and
a subterranean formation comprising the diverter composition therein.

Embodiment 64 provides the system of Embodiment 63, further comprising
a tubular disposed in the subterranean formation; and
a pump configured to pump the diverter composition in the subterranean formation through the tubular.

Embodiment 65 provides a diverter composition for treatment of a subterranean formation, the diverter composition comprising:
an invert emulsion comprising
a continuous oil phase comprising at least one rheological modifier; and
an internal aqueous phase.

Embodiment 66 provides a diverter composition for treatment of a subterranean formation, the diverter composition comprising:
an invert emulsion comprising
about 10 vol % to about 50 vol % of a continuous oil phase comprising at least one rheological modifier comprising at least one of a mono- or poly-(substituted or unsubstituted ($C_2$-$C_{10}$)alkylene) diol having 0, 1, or 2 hydroxy groups etherified with a ($C_1$-$C_{50}$) hydrocarbyl group, a clay, a silica, and a di- or tri-($C_{10}$-$C_{50}$)hydrocarbylamine, wherein each ($C_{10}$-$C_{50}$)hydrocarbyl and ($C_1$-$C_{50}$)hydrocarbyl is independently selected and is independently substituted or unsubstituted, and wherein each ($C_{10}$-$C_{50}$)hydrocarbyl is independently interrupted by 0, 1, 2, or 3 groups selected from —O—, —S—, and substituted or unsubstituted —NH—, wherein the rheological modifier is about 0.001 vol % to about 10 vol % of the invert emulsion; and
about 50 vol % to about 90 vol % of an internal aqueous phase comprising an internal active agent comprising at least one of a bridging agent and a polymer comprising a repeating unit that is a carboxylic acid- or amide-substituted substituted or unsubstituted ethylene unit, wherein each ethylene unit is independently further unsubstituted or further substituted, wherein each carboxylic acid and amide substituent is independently directly substituted on the ethylene unit or substituted via a linker that is a ($C_1$-$C_{10}$) substituted or unsubstituted hydrocarbyl interrupted by 0, 1, 2, or 3 groups chosen from —O—, —S—, and substituted or unsubstituted —NH—, wherein each amide substituent is independently unmodified or is hydrophobically modified, wherein each carboxylic acid substituent is independently unmodified, is a salt thereof, or is hydrophobically modified, wherein the hydrophobic modification is independently a ($C_4$-$C_{50}$) substituted or unsubstituted hydrocarbyl group interrupted by 0, 1, 2, or 3 groups chosen from —O—, —S—, and substituted or unsubstituted —NH—;
wherein about 0.001 vol % to about 15 vol % of the invert emulsion is one or more emulsifiers.

Embodiment 67 provides a method of preparing a composition for treatment of a subterranean formation, the method comprising:
forming a diverter composition comprising an invert emulsion comprising
a continuous oil phase comprising at least one rheological modifier; and
an internal aqueous phase.

Embodiment 68 provides the composition, method, or system of any one or any combination of Embodiments 1-67 optionally configured such that all elements or options recited are available to use or select from.

What is claimed is:

1. A method of treating a subterranean formation, comprising:
placing a diverter composition comprising an invert emulsion into a subterranean formation, wherein the invert emulsion comprises:
a continuous oil phase comprising at least one rheological modifier; and
an internal aqueous phase,
wherein the internal aqueous phase comprises an internal active agent, and wherein the internal active agent comprises a polymer that is at least partially hydrophobically modified, wherein the hydrophobic modification is independently a $(C_4\text{-}C_{50})$ substituted or unsubstituted hydrocarbyl group interrupted by 0, 1, 2, or 3 groups selected from the group consisting of —O—, —S—, and substituted or unsubstituted —NH—.

2. The method of claim 1, wherein the invert emulsion breaks in the subterranean formation, such that the internal aqueous phase contacts the subterranean formation, and wherein the contacting of the aqueous phase and the subterranean formation reduces permeability of the contacted subterranean formation to aqueous liquids by about 70% to about 95% and reduces permeability of the contacted subterranean formation to oil by about 30% to about 70%.

3. The method of claim 1, wherein the aqueous phase is about 50 vol % to about 90 vol % of the invert emulsion.

4. The method of claim 1, wherein the aqueous phase comprises at least one of brine, produced water, flowback water, brackish water, and sea water, and wherein the aqueous phase has a total dissolved solids level of about 1,000 mg/L to about 250,000 mg/L.

5. The method of claim 1, wherein the aqueous phase has a pH of about −2 to about 6.5, and wherein the aqueous phase comprises at least one of HCl, $H_2SO_4$, HF, acetic acid, and formic acid.

6. The method of claim 1, wherein the at least partially hydrophobically-modified polymer comprises a polyacrylamide or a poly(di($C_1$-$C_5$)alkylamino($C_1$-$C_5$)alkyl ($C_0$-$C_5$) alkylacrylate.

7. The method of claim 1, wherein the at least partially hydrophobically-modified polymer comprises a polydimethylaminoethyl acrylate.

8. The method of claim 1, wherein the rheological modifier comprises at least one of a viscosifier and an elastifier.

9. The method of claim 1, wherein the rheological modifier comprises at least one of a di- or tri-($C_{30}$-$C_{50}$) hydrocarbylamine, and a mono- or poly-($C_2$-$C_{10}$)alkylene diol mono($C_1$-$C_{10}$)alkyl ether.

10. The method of claim 1, wherein the rheological modifier comprises dipropylene glycol monomethyl ether, (12E,15E)-N-[(21E,24E)-hexatriaconta-21,24-dien-1-yl]hexatriaconta-12,15-dien-1-amine, or a combination thereof.

11. The method of claim 1, wherein the rheological modifier is about 0.1 vol % to about 2 vol % of the invert emulsion.

12. The method of claim 1, wherein the diverter composition further comprises at least one emulsifier, wherein the emulsifier has an HLB (Davies' scale) of about 3 to about 7, and wherein the emulsifier comprises at least one of a mono- or poly-($C_2$-$C_{10}$)alkylene diol mono($C_1$-$C_{10}$)alkyl ether, a ($C_2$-$C_{30}$)alkanoic acid, and a ($C_2$-$C_{30}$)alkenoic acid.

13. The method of claim 1, wherein the diverter composition further comprises at least one emulsifier, wherein the emulsifier comprises at least one of acetic acid, ethylene glycol monobutyl ether, diethylene glycol monobutyl ether, a ($C_4$-$C_{50}$) alpha-olefin, an isomerized ($C_4$-$C_{50}$) alpha-olefin, ethylene glycol, propylene glycol, and wherein the emulsifier comprises at least one of petroleum distillate, hydrotreated petroleum distillate, diesel, naphthalene.

14. The method of claim 1, wherein the diverter composition further comprises at least one emulsifier, and wherein the emulsifier is about 0.1 vol % to about 5 vol % of the invert emulsion.

15. The method of claim 1, wherein the placing of the diverter composition in the subterranean formation comprises pumping the diverter composition through a drill string disposed in a wellbore, through a drill bit at a downhole end of the drill string, and back above-surface through an annulus.

16. The method of claim 15, further comprising processing the diverter composition exiting the annulus with at least one fluid processing unit to generate a cleaned composition and recirculating the cleaned composition through the wellbore.

17. A system for performing the method of claim 1, the system comprising:
a drill string disposed in a wellbore, wherein the drill string comprises a drill bit at a downhole end of the drill string, and wherein the subterranean formation comprises the wellbore;
an annulus positioned between the drill string and the wellbore; and
a pump configured to circulate the diverter composition through the drill string, through the drill bit, and back above-surface through the annulus.

18. A method of treating a subterranean formation, comprising:
placing a diverter composition comprising an invert emulsion into a subterranean formation, wherein the invert emulsion comprises:
about 10 vol % to about 50 vol % of a continuous oil phase comprising at least one rheological modifier comprising at least one of a mono- or poly-(substituted or unsubstituted ($C_2$-$C_{10}$)alkylene) diol having 0, 1, or 2 hydroxy groups etherified with a ($C_1$-$C_{50}$) hydrocarbyl group, a clay, a silica, and a di- or tri-($C_{10}$-$C_{50}$) hydrocarbylamine, wherein each ($C_{10}$-$C_{50}$) hydrocarbylamine and ($C_1$-$C_{50}$) hydrocarbyl is independently selected and is independently substituted or unsubstituted, and wherein each ($C_{10}$-$C_{50}$) hydrocarbylamine is independently interrupted by 0, 1, 2, or 3 groups selected from —O—, —S—, and substituted or unsubstituted —NH—, wherein the rheological modifier is about 0.001 vol % to about 10 vol % of the invert emulsion;
about 50 vol % to about 90 vol % of an internal aqueous phase comprising an internal active agent comprising at least one of a bridging agent and a polymer comprising a repeating unit that is a carboxylic acid- or amide-substituted substituted or unsubstituted ethylene unit, wherein each ethylene unit is independently further unsubstituted or further substituted, wherein each carboxylic acid and amide substituent is independently directly substituted on the ethylene unit or substituted via a linker that is a ($C_1$-$C_{10}$) substituted or unsubstituted hydrocarbyl interrupted by 0, 1, 2, or 3 groups selected from the group consisting of —O—, —S—, and substituted or unsubstituted —NH—, wherein each amide substituent is independently unmodified or is hydrophobically modified, wherein each carboxylic acid substituent is independently unmodified, is a salt thereof, or is hydrophobically modified, wherein the hydrophobic modification is independently a ($C_4$-$C_{50}$) substituted or unsubstituted hydrocarbyl group interrupted by 0, 1, 2, or 3 groups selected from the group consisting of —O—, —S—, and substituted or unsubstituted —NH—; and
wherein about 0.001 vol % to about 15 vol % of the invert emulsion is one or more emulsifiers.

19. A diverter composition for treatment of a subterranean formation, the diverter composition comprising:

an invert emulsion comprising:
  about 10 vol % to about 50 vol % of a continuous oil phase comprising at least one rheological modifier comprising at least one of a mono- or poly-(substituted or unsubstituted ($C_2$-$C_{10}$)alkylene) diol having 0, 1, or 2 hydroxy groups etherified with a ($C_1$-$C_{50}$) hydrocarbyl group, a clay, a silica, and a di- or tri-($C_{10}$-$C_{50}$) hydrocarbylamine, wherein each ($C_{10}$-$C_{50}$) hydrocarbylamine and ($C_1$-$C_{50}$) hydrocarbyl is independently selected and is independently substituted or unsubstituted, and wherein each ($C_{10}$-$C_{50}$) hydrocarbylamine is independently interrupted by 0, 1, 2, or 3 groups selected from —O—, —S—, and substituted or unsubstituted —NH—, wherein the rheological modifier is about 0.001 vol % to about 10 vol % of the invert emulsion; and
  about 50 vol % to about 90 vol % of an internal aqueous phase comprising an internal active agent comprising at least one of a bridging agent and a polymer comprising a repeating unit that is a carboxylic acid- or amide-substituted substituted or unsubstituted ethylene unit, wherein each ethylene unit is independently further unsubstituted or further substituted, wherein each carboxylic acid and amide substituent is independently directly substituted on the ethylene unit or substituted via a linker that is a ($C_1$-$C_{10}$) substituted or unsubstituted hydrocarbyl interrupted by 0, 1, 2, or 3 groups selected from the group consisting of —O—, —S—, and substituted or unsubstituted —NH—, wherein each amide substituent is independently unmodified or is hydrophobically modified, wherein each carboxylic acid substituent is independently unmodified, is a salt thereof, or is hydrophobically modified, wherein the hydrophobic modification is independently a ($C_4$-$C_{50}$) substituted or unsubstituted hydrocarbyl group interrupted by 0, 1, 2, or 3 groups selected from the group consisting of —O—, —S—, and substituted or unsubstituted —NH—;
wherein about 0.001 vol % to about 15 vol % of the invert emulsion comprises one or more emulsifiers.

* * * * *